United States Patent [19]
Völcker

[11] Patent Number: 5,986,262
[45] Date of Patent: Nov. 16, 1999

[54] PROBE ARRAY FOR A SCANNING PROBE MICROSCOPE

[75] Inventor: Martin Völcker, Königsbronn-Zang, Germany

[73] Assignee: Carl-Zeiss-Stiftung, Germany

[21] Appl. No.: 09/010,307

[22] Filed: Jan. 21, 1998

[30] Foreign Application Priority Data

Jan. 21, 1997 [DE] Germany .......................... 197 01 701

[51] Int. Cl.⁶ .............................. H01J 37/00; G01B 5/28
[52] U.S. Cl. ............................. 250/306; 250/307; 73/105
[58] Field of Search ................................... 250/306, 307; 73/105

[56] References Cited

U.S. PATENT DOCUMENTS 5,015,850  5/1991  Zdeblick et al. .
5,036,490  7/1991  Kajimura et al. .
5,053,995  10/1991 Kajimura et al. .
5,294,790  3/1994  Ohta et al. .
5,360,978  11/1994 Gueret .
5,461,907  10/1995 Tench et al. .
5,517,280  5/1996  Quate .

*Primary Examiner*—Edward P. Westin
*Assistant Examiner*—Nikita Wells

[57] ABSTRACT

A probe array for a scanning microscope has numerous individual probes that respectively have a probe tip on one or more beams. The individual probes are arranged in the form of a two-dimensional grid such that the directions of the beams include with respect to the directions of the grid an angle which is not equal to 0° or 180°. The grid spacings in both mutually perpendicular directions can be smaller than the length of the beams, due to the inclined arrangement of the beams relative to the translation vectors of the grid formed by the probe tips (3a–3p). The two beams (4a, 5a) of each individual probe are mutually arranged in a V-shape to form a mutually nested arrangement of the individual probes.

10 Claims, 4 Drawing Sheets

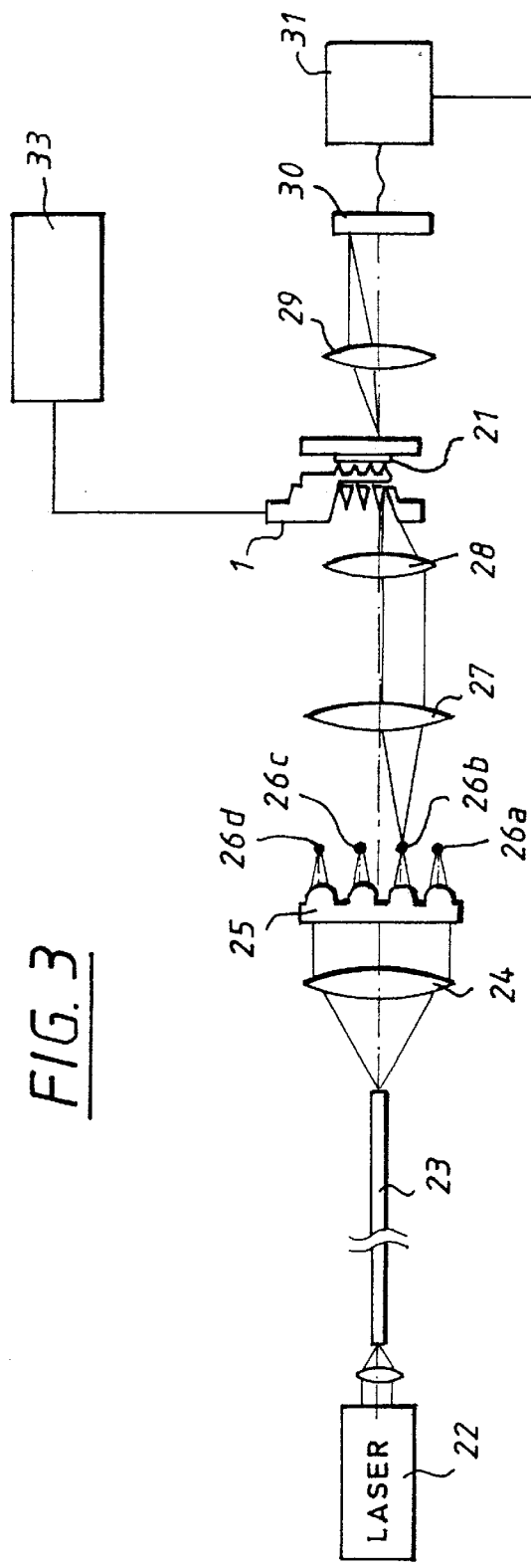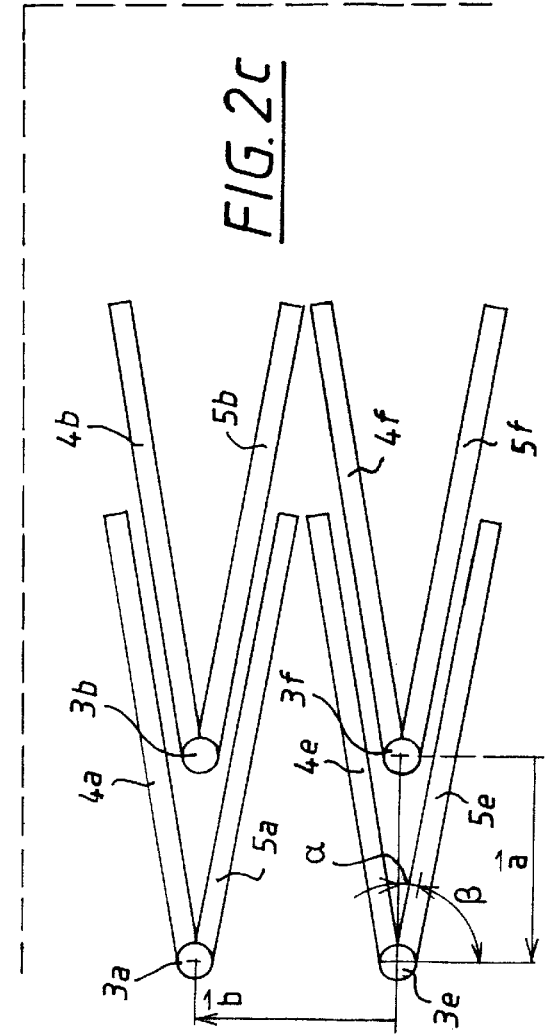
FIG. 3
FIG. 2C

PROBE ARRAY FOR A SCANNING PROBE MICROSCOPE

BACKGROUND OF THE INVENTION

1. Field of the Invention

The present invention relates to a probe array for scanning probe microscopes and more particularly, to a probe array for tunneling microscopes.

2. Discussion of Relevant Art

A probe array for scanning probe microscopes, in particular for tunneling microscopes and atomic force microscopes, is known from U.S. Pat. No. 5,015,850. The individual probes respectively consist of a thin beam that can be deflected perpendicularly of its longitudinal direction, and a probe tip arranged at the free end of the beam. These individual probes are arranged as a two-dimensional grid, the long axes of the beams being aligned parallel to one grid direction of the two-dimensional grid. The spacings of the probe tips from each other are thus considerably greater in one direction than the length of the beams. Therefore with this arrangement, at least in one direction of the array, no probe spacings can be attained which are smaller than the beam lengths.

A further probe array for tunneling microscopes is known from U.S. Pat. No. 5,360,978, in which the individual probes are arranged in several mutually parallel rows, which again have numerous individual probes. However, the probe tips are not received on individual beams. Such a probe array is therefore not suitable for microscopes in which the distance between the probe tips and the specimen to be measured is regulated corresponding to the interacting atomic forces between the probe tip and the specimen.

A one-dimensional, linear probe array for near-field lithography is known from U.S. Pat. No. 5,517,280. In this arrangement the individual probe tips are arranged on deflectable beams. The individual beams are arranged as an array, parallel to the longitudinal direction of the beams. A two-dimensional probe array is not described in this document.

A linear array of several two-beam structures, which are respectively V-shaped, is described in U.S. Pat. No. 5,461,907 for atomic force microscopy. One of the two-beam structures has a probe for atomic force microscopy, and the two other structures respectively have a sharp-edged attachment for the micromanipulation (moving and cutting) of microscopic objects. No two-dimensional probe array is described in this document, either.

SUMMARY OF THE INVENTION

The object of the present invention is to provide a probe array for scanning microscopes, wherein the array has numerous individual probes with one or more beams in a two-dimensional grid arrangement and in which the spacing of the probe tips in two mutually perpendicular directions can be smaller than the lengths of the beams. This object is attained by a probe array in which a plurality of individual probes each has a probe tip on one or more beams. The individual probes are arranged in the form of a two-dimensional grid and the beams are arranged at an angle with respect to the direction of the grid that is not equal to 0° or 180°.

The probe array according to the invention has numerous individual probes that are mutually arranged in the form of a two-dimensional grid. Each individual probe has a probe tip that is received on one beam or on two beams. The longitudinal directions of the beams respectively include an angle not equal to 0° or 180° with the directions of the grid, and thus with the mathematical grid vectors that transform a point of the grid into the next neighboring grid point.

Due to the arrangement, inclined toward each other, of the beams of the individual probes relative to the translation vectors of the grid, the length of the beam can amount to a multiple of the raster pitch of nearest neighboring grid points. In the terminology of crystal physics, this means that one dimension of the unit cell that receives each individual probe is greater than the raster pitch of nearest neighboring grid points.

Preferably each individual probe has two beams that are mutually arranged in a V-shape. Due to the two-beam arrangement, that is known for example from the above-mentioned U.S. Pat. No. 5,461,907, the individual probes have a higher torsional stiffness than the individual probes with only one beam.

The beams of the individual probes are preferably arranged via spacers on a common support structure. The support structure, on which the beams are received via spacers is aligned parallel to the plane of the beams.

For detecting the interatomic interaction between the probe tip and the scanned specimen, and readjusting the spacing to a fixed value of the interatomic interaction, the beams can be deflected by beam bending perpendicular to the longitudinal axis of the beams and in the direction of the probe tips. In order to prevent contact of the support structure with the specimen, the probe tips of the individual probes are longer than the maximum deflection of the probe tips that results from a maximum deflection of the beams. Alternatively, or additionally, the beams can have a curvature that is impressed during the production process and directed toward the probe tips.

Furthermore, the support structure and the beams preferably have a respective electrically conductive electrode for each individual probe. These electrodes form a capacitor whose capacity is changed when the beam of a probe tip is deflected. This capacity change can be applied for adjusting the spacing between the probe tip and the specimen. The beams with the electrodes also act as positioning elements, in that, by means of the field strength of a voltage applied to the electrodes, a targeted beam bending is produced that is required for a constant spacing between each probe tip and the specimen.

The probe array according to the invention is preferably applied in a scanning probe microscope with a control electronics for a parallel and mutually independent measurement of capacity changes of the individual probes, and a targeted bending of the beam of each individual probe for a movement of the individual probes in the direction of the probe tip. By arranging many individual probes in a two-dimensional array, the image display takes place in parallel at points on the specimen to be scanned, at a number of points corresponding to the number of probes. In contrast to scanning probe microscopes with only a single probe, the image recording time is thereby shortened by a factor corresponding to the inverse of the number of probes. In a further advantageous embodiment, the probe tips are constructed as light guides. Such a probe array with light-conducting probe tips can be used in an optical near-field microscope.

BRIEF DESCRIPTION OF THE DRAWINGS

The present invention will now be described, taken together with the drawings, in which:

FIG. 2c shows an enlarged and simplified excerpt from FIG. 2a; and

FIG. 3 shows a sketch of principle of an optical near-field microscope as an example of a scanning probe microscope with a probe array according to the invention.

DETAILED DESCRIPTION OF PREFERRED EMBODIMENTS

Figure 2A:
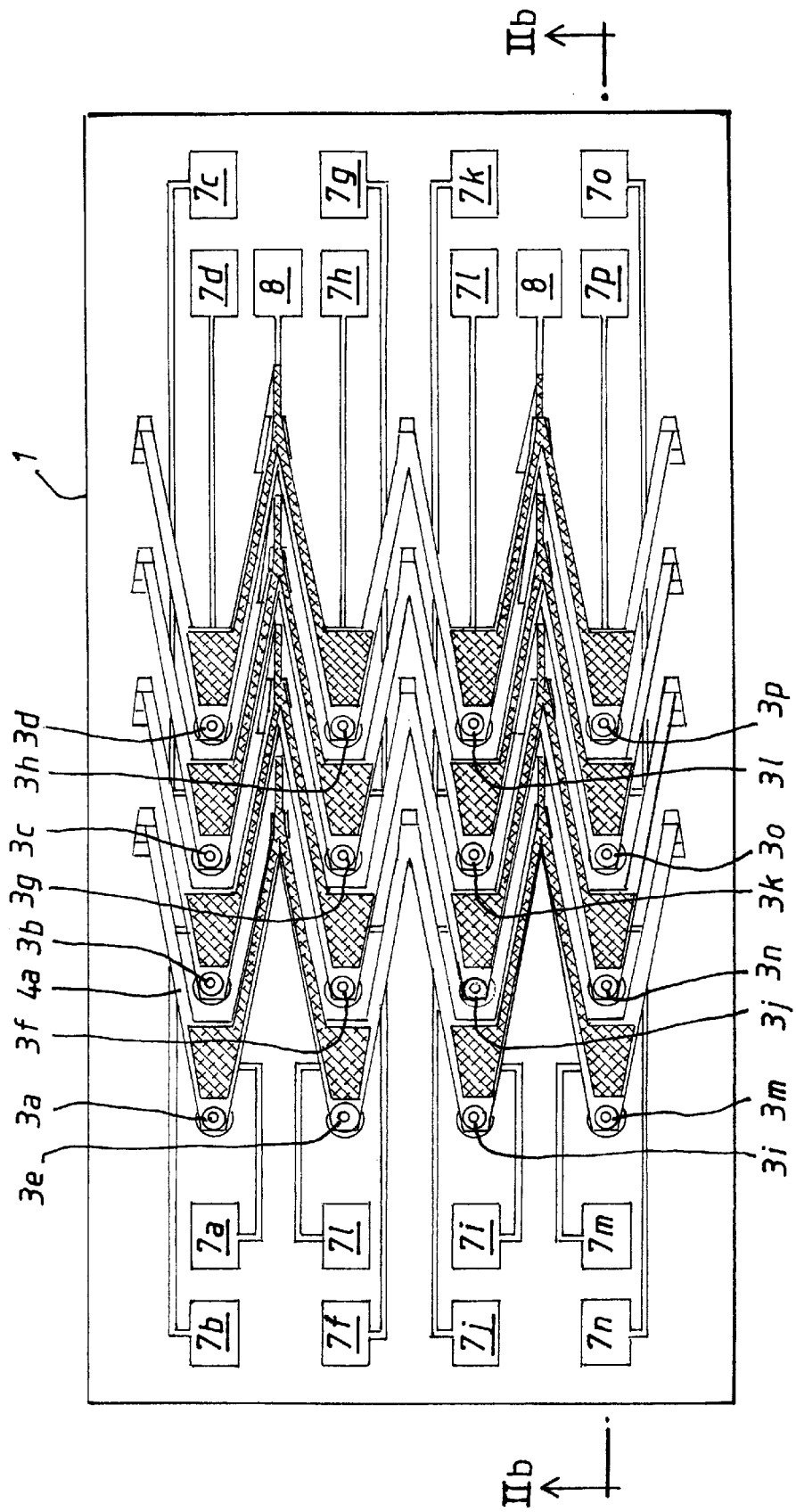
FIG. 2a shows a plan view of a probe array according to the invention, when looking at the probe tips, with 16 individual probes arranged as a regular, two-dimensional grid.
Figure 2B:
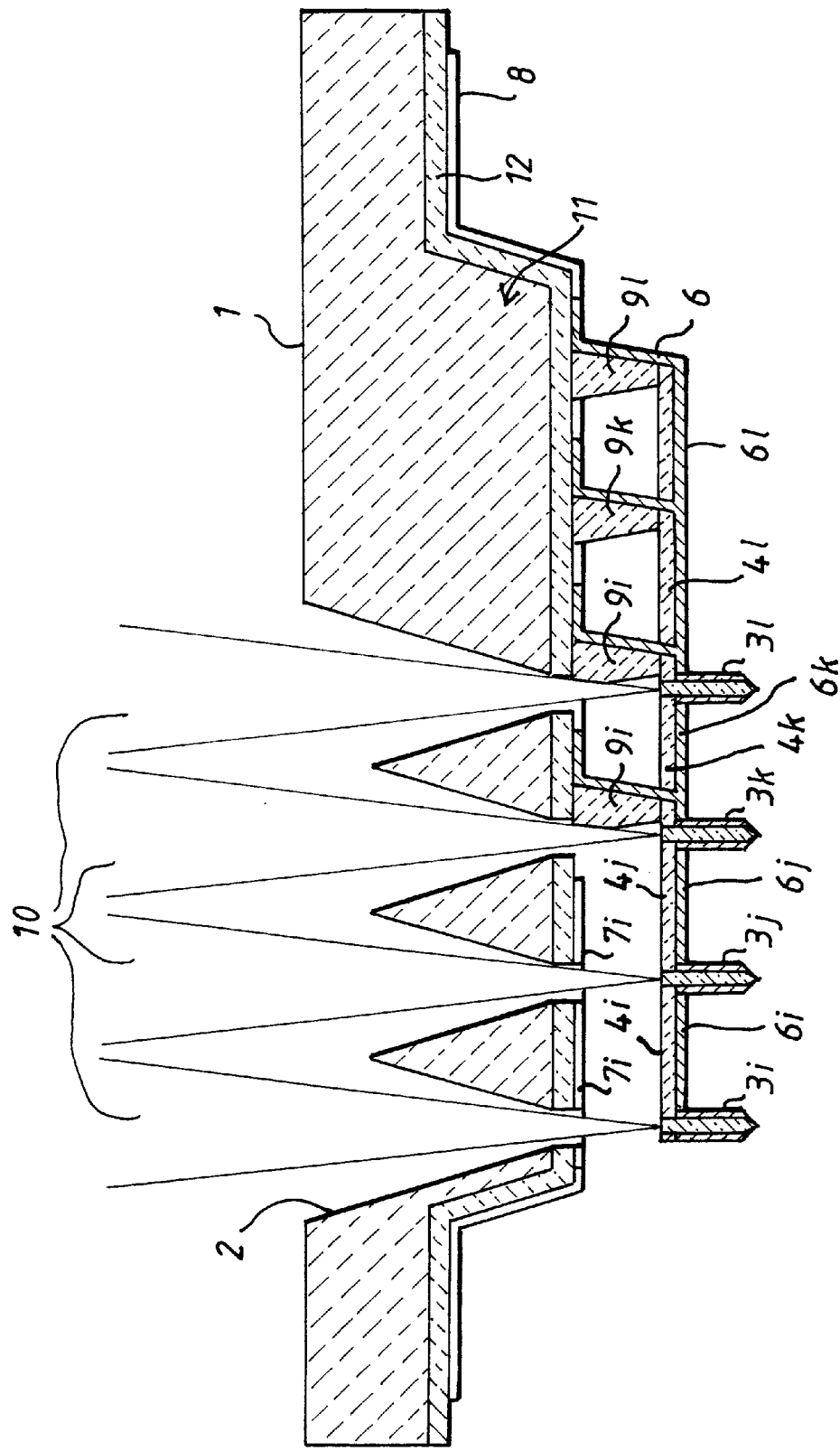
FIG. 2b shows a section through the probe array in FIG. 2a, along the line IIb—IIb.

The probe array shown in FIGS. 2a and 2b consists of a support structure (1) and a total of 16 individual probes arranged on it, which are arranged in the form of a regular, two-dimensional grid. The probe tips of the 16 individual probes are denoted by (3a–3p) in FIG. 2a.

Figure 1A:
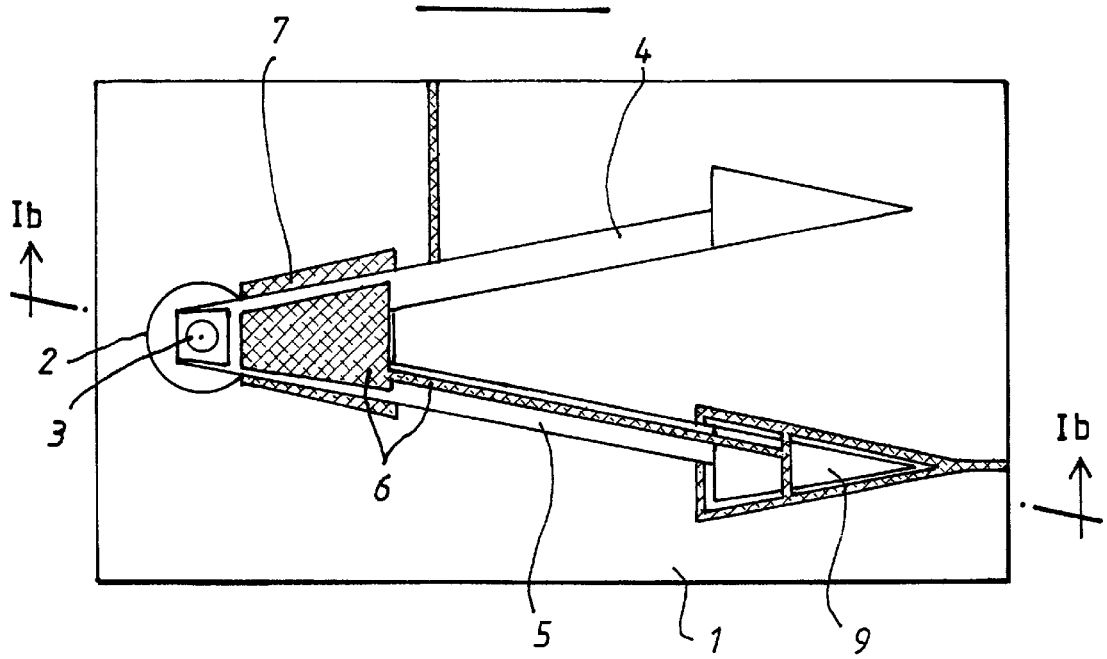
FIG. 1a shows a plan view of a single probe of a probe array according to the invention, when looking at the probe tip.
Figure 1B:
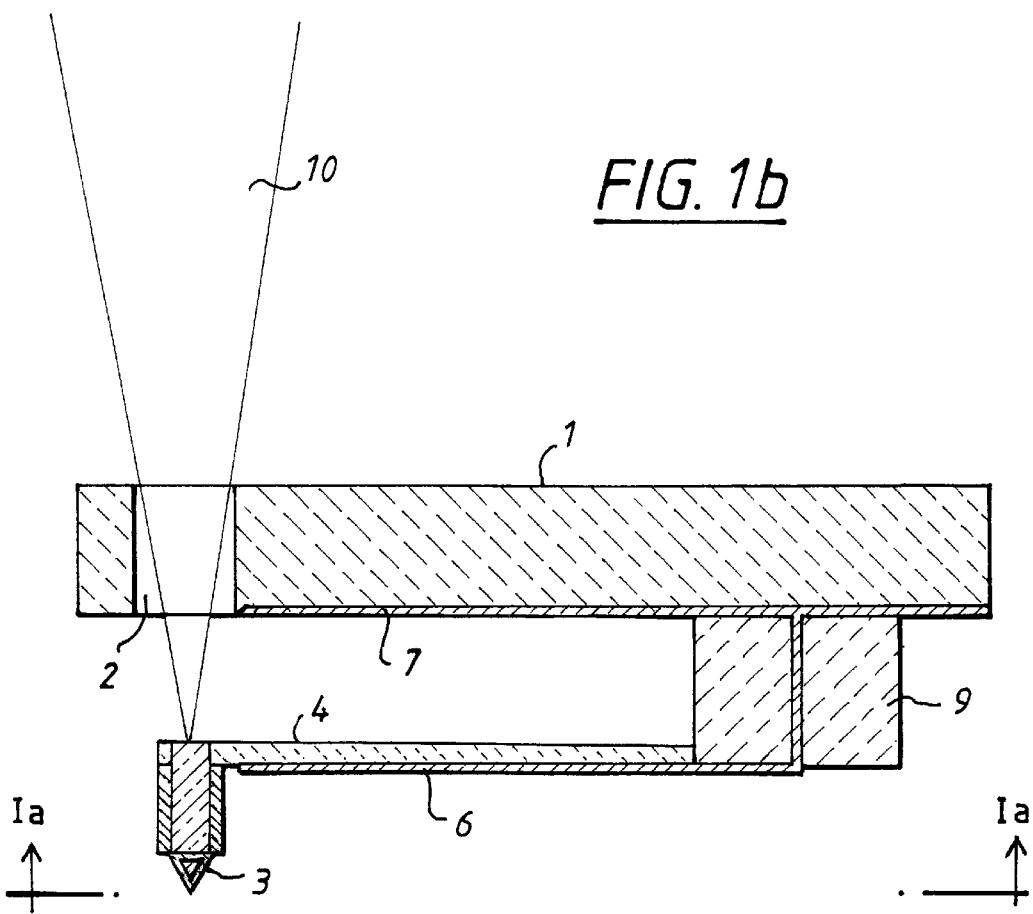
FIG. 1b shows a section through the single probe of FIG. 1a along the section line Ib—Ib.

The construction of the 16 individual probes is described in more detail hereinbelow with reference to FIGS. 1a and 1b. Each individual probe has two beams (4, 5) mutually arranged in a V-shape, their length in the longitudinal direction of the beams being about 40–60 $\mu$m. These beams (4, 5) are received by means of spacers (9) on the underside of the support structure (1). The probe tip (3) is received on the beams (4, 5) at the tip of the V formed by the two beams (4, 5), and thus where the two beams (4, 5) are connected together. In the embodiment shown, the probe tip (3) consists of a transparent inner body with a thin outer metallic coating. Such transparent probe tips (3) are particularly suitable for optical near-field microscopy. A hole (2) is provided in order to couple a light ray (10) into the end of the probe tip (3) that faces the support structure (1).

The carrier structure (1) has an electrically conductive coating (6) on the side of the carrier structure (1) that faces toward the probe tip (3). A further conductive coating is provided on one of the two beams (5) and in the region in which the two beams (4, 5) are closely adjacent to each other. The spacing of the two conductive coatings (6, 7) corresponds to the thickness of the spacer (9) and amounts to about 5–10 $\mu$m. The two electrically conductive coatings (6, 7) form a capacitor, the changes of whose capacity when the two beams (4, 5) are deflected provides a measure of the changing distance between the probe tip (3) and a specimen (not shown in FIG. 1b). The capacitor formed by the coatings (6, 7) can also serve at the same time as an adjusting element by the application of a DC voltage, since an applied voltage brings about a bending of the beam perpendicular to the longitudinal axis of the beam.

In the probe array of FIG. 2a, the individual probes with the probe tips (3a–3p) are arranged with respect to each other so that the mid-axes of the probe tips (3a–3p) form a regular, two-dimensional grid. The spacing of the mid-axes of adjacent probe tips (3a, 3b; 3a, 3e) is identical in both directions of translation of the two-dimensional grid, and is smaller than the length of the beams (4a, 5a) of the individual probes. In order to attain such a compact arrangement of the individual probes, the individual probes are nested one within the other. A more detailed description of this nested arrangement of the individual probes is given with reference to FIG. 2c, in which four probe tips (3a, 3b; 3e, 3f) are respectively shown only with their two beams (4a, 5a; 4b, 5b; 4e, 5e; 4f, 5f). The probe tips (3a, 3b, 3e, 3f) form a regular grid, with the grid vectors (a, b) by which the grid points (mid-axes of the probe tips (3a, 3b, 3e, 3f)) are transformed into each other. The grid points represent points which, in the terminology of crystal physics, are identical under translation. They result from a starting grid point by translation in the direction of an integer linear combination of the grid vectors (a, b), and thus by translation with the vector $$t = ma + nb$$

where m and n are integers. It is important for the close arrangement of the probe tips in the probe array according to the invention that the beams (4a, 5a; 4b, 5b; 4e, 5e; 4f, 5f) include with the grid vectors a, b, angles ($\alpha$, $\beta$) that deviate from 0° and 180°. The angles $\alpha$, $\beta$ are chosen such that a sufficiently deep nesting of the individual probes, and thus the desired spacings of the probe tips in two mutually perpendicular directions, can be attained. The individual probes can thereby be mutually nested such that the spacings of the nearest neighboring probe tips are less than the length of the beams (4a, 5b; 4b, 5b; 4e, 5e; 4f, 5f). The probe array with 4×4 individual probes in FIG. 2a is constructed from 2 identical regions, each with 2×4 probes. The first region contains the 8 probe tips (3a–3h) and the second region the 8 probe tips (3i–3p). The electrically conductive coatings of the beams (4) of the 8 individual probes of each region are connected together, so that only a single contact (8) is required in each region for this conductive coating. The electrically conductive coatings on the underside of the support structure (1) are however mutually electrically insulated, so that 8 mutually independent capacitors are formed. Therefore 8 contacts (7a–7g; 7i–7p) of the electrically conductive coatings are provided on the underside of the support structure (1), corresponding to the 8 individual probes in each region.

It should be noted that it is possible to electrically conductive coat both beams of each individual probe. Furthermore, it should be noted that a portion of the contacts for the electrically conductive coatings on the underside of the support structure (1) occur on the one side of the individual probes, and the contacts of the remaining conductive coatings occur on the other side of the individual probes of the region.

Probe arrays with more than 16 individual probes can be easily prepared in that further regions are added, respectively, with 8 individual probes. This results in probe arrays with 3×8, 4×8, etc., individual probes. In principle, each region can also have more than 8 probes, in that a greater number of individual probes are mutually nested. Here 2×6, 2×8, 2×10, etc., individual probes in each region are conceivable. The maximum number of the mutually nestable individual probes is then only limited by the number of conductive paths that are possible, from a consideration of available space, to form for making the electrical contacts. If such problems arise with the conductive paths, these can also be arranged in different planes, as is usual in microelectronics, so that any optional number of individual probes is possible.

The production of the probe array according to the invention can be produced using the processes that are conventional in microstructuring. A silicon wafer with a thickness of about 60 µm can be a starting point for a support structure. In a first step, the edge region is etched away on one side of the wafer, so that a raised middle part (11) results. The etched edge regions later serve as bonding surfaces for making electrical contacts. In a second process step, both the raised region and the etched region are coated with an insulating layer (12), 1 µm thick, of silicon nitride, by chemical vapor deposition (CVD) technology. On the other side, pyramidal holes (2) are made by anisotropic wet etching, for later passage of light through the silicon substrate (1).

In a third process step, a first electrode layer, 0.2 µm thick, for the conductive coating (7, 7i, 7j), the contacting surfaces (8, 7a–7p), and the required conductive paths are made by the atomization of platinum. The spacers (9, 9i–9l), which later serve to receive the beams (4, 4i–4l, 5), and which have a thickness of 5–10 µm, are then produced by CVD of silicon nitride. The silicon nitride layer formed for this purpose on the sacrificial layer has a thickness of about 1 µm. By subsequent vapor deposition of gold, a second electrode layer (6i–6l), 0.2 µm thick, is deposited on the beams (4i–4l), to obtain a conductive connection of each individual probe to a respective beam and the connection of the resulting electrodes via the spacers (9i–9l) with the conductive path of the first electrode layer, going out from the common contact (8). In a seventh process step, the probe tips (3i–3l) are constructed. For this purpose, a silicon nitride layer, about 5–10 µm thick, is first constructed by CVD at the site of the probe tip, and aluminum is then vapor deposited on it from the exterior. The silicon nitride serves later as a light guide in optical near-field microscopy.

Holes through the insulating layer at the places provided for the passage of light are then produced by ion etching. As a final step, it is only necessary to remove the sacrificial layer. The production of the probe array is then complete, and it only needs to be bonded at the contact sites (8, 7a–7p) that have been produced, and can be used, for example in the optical near-field microscope that is schematically shown in FIG. 3.

In FIG. 3, the probe array, described hereinabove with reference to FIGS. 2a–2c, is shown on a smaller scale, and the carrier structure of the probe array is again denoted by the reference number (1). The light source, for example a laser, required for optical near-field microscopy is denoted by (22). The light coming from the light source (22) is first conducted via an optical fiber (23) to the near-field microscope proper. The light coming from the optical fiber is collimated by a collimator (24) and is focused by a following lens array (25). The lens array (25) has as many individual lenses as the probe array has individual probes. A number of foci (26a–26d) thus aris in the rear focal plane of the lens array (25), and corresponds to the number of individual probes. The foci (26a–26d) of the lens array (25) are imaged, reduced, on the rear side of the probe tips of the probe array by a subsequent imaging optics with five-fold reduction, and are thereby coupled into the probe tips.

The light coupled into the probe tips emerges again on the opposite side of the probe tips, and interacts in a known manner with the specimen (21). The light passing through the specimen (21), enlarged by a factor of 3 by an enlarging optics (29), is passed to, and detected by, a position-resolving detector (30), which has an independent sensor surface for each individual probe of the probe array (1). The output signals of the detector (30) are processed in a video card (31) to a video image, which is then displayed on a monitor (32).

Furthermore, a control electronics (33) is provided, which is connected to the probe array (1), or more precisely, to the contacts (6, 7a–7o) of the probe array (1), and which detects the deflections of the beams of the individual probes independently of each other, based on the capacity of the capacitors of the individual probes, and by means of which a voltage applied to the capacitors, respectively regulates the distance between the individual probe tips and the surface of the specimen (21) to a constant value.

As an alternative to the embodiment shown, the detection of the light can also take place by reflection in the case of non-transparent specimens. In this case, the detector (30) would be arranged on the same side of the specimen (21) as the probe array (25).

In the probe array that has been described with reference to FIGS. 2a–2c, the spacing of the probe tips amounts to less than 100 µm, typically 10–30 µm. In contrast to this, the length of the beams amounts to about 40 µm, so that changes of the interatomic interactions between the probe tip and the specimen can be measured with a sufficiently low spring constant of the beam, and with a sufficient sensitivity of the deflection of the beam.

What is claimed is:

1. A probe array for a scanning probe microscope comprising:

a plurality of individual probes, each having a probe tip (3a–3p) on one or more beams (4a, 4b, 4e, 4f, 5a, 5b, 5e, 5f), wherein said individual probes are arranged in the form of a two-dimensional grid, and the direction of said beams (4a, 4b, 4e, 4f, 5a, 5b, 5e, 5f) are at an angle with respect to the directions of said grid (a, b) that is not equal to 0° or 180°.

2. A probe array according to claim 1, wherein the spacings of said probe tips in two mutually perpendicular directions are smaller than the lengths of said beams (4a, 4b, 4e, 4f, 5a, 5b, 5e, 5f).

3. A probe array according to claim 1, further comprising a common support structure (1) and spacers (9i, 9j, 9k, 9l), wherein said beams are arranged on said common support structure (1) via said spacers (9i, 9j, 9k, 9l).

4. A probe array according to claim 3, wherein said common support structure (1) is arranged in one plane, parallel to a plane of said beams (4a, 4b, 4e, 4f, 5a, 5b, 5e, 5f).

5. A probe array according to claim 1, wherein said beams (4a, 4b, 4e, 4f, 5a, 5b, 5e, 5f) are deflectable over respective paths perpendicular to a longitudinal axis of said beams, and said probe tips (3a, 3j, 3k, 3l) have lengths that are greater than maximum paths of deflection of said beams.

6. A probe array according to claim 1, wherein said beams are curved in a direction of said probe tips.

7. A probe array according to claim 1, further comprising a common support structure (1) wherein each of said beams is arranged on said common support structure (1) and each of said beams and said common support structure (1) has an electrically conductive electrode (6, 7a–7p).

8. A probe array according to claim 3, wherein said common support structure (1) has a plurality of holes (2) for passage of light, which are associated with said probe tips.

9. A probe array according to claim 1 in combination with a scanning probe microscope.

10. The combination according to claim 9, further comprising a common support structure (1) for said beams, said common support structure (1) and said beams each having an electrically conductive electrode (6, 7a–7p), and control electronics (33) for parallel and mutually independent selection of said electrically conductive electrodes for individual probes for detecting changes in deflection of said individual probes in a direction of said probe tips.

* * * * *